United States Patent [19]

Katayama

[11] Patent Number: 4,831,653

[45] Date of Patent: May 16, 1989

[54] SYSTEM FOR REGISTERING SPEECH INFORMATION TO MAKE A VOICE DICTIONARY

[75] Inventor: Hirohiko Katayama, Kawasaki, Japan

[73] Assignee: Canon Kabushiki Kaisha, Tokyo, Japan

[21] Appl. No.: 120,788

[22] Filed: Nov. 16, 1987

[30] Foreign Application Priority Data

Nov. 12, 1980 [JP] Japan ................................ 55-159235

[51] Int. Cl.⁴ ................................................. G10L 5/00
[52] U.S. Cl. .......................................... 381/43; 381/51
[58] Field of Search ..................................... 381/29–53; 364/513, 513.5

[56] References Cited

U.S. PATENT DOCUMENTS

| | | |
|---|---|---|
| 3,172,954 | 3/1965 | Belar et al. ............................. 381/44 |
| 3,509,280 | 4/1970 | Jones . |
| 3,770,892 | 11/1983 | Clapper . |
| 4,092,493 | 5/1978 | Rabiner et al. ......................... 381/43 |
| 4,181,821 | 1/1980 | Pirz et al. ............................... 381/43 |
| 4,461,023 | 7/1984 | Katayama ............................... 381/43 |

Primary Examiner—Emanuel S. Kemeny
Attorney, Agent, or Firm—Fitzpatrick, Cella, Harper & Scinto

[57] ABSTRACT

A system for having a mode for registering storing a necessary typical spoken word pattern for use in speech recognition and inputting a same spoken word a plurality of times. In the mode for registering a word pattern, a previous input spoken word, input prior to the Nth time, is reproduced. After listening to the reproduced spoken prompt word, the Nth input of the same spoken word is effected. The system registers one typical spoken word of a well-averaged voice pattern with high accuracy while increasing the system speech recognition rate.

6 Claims, 2 Drawing Sheets

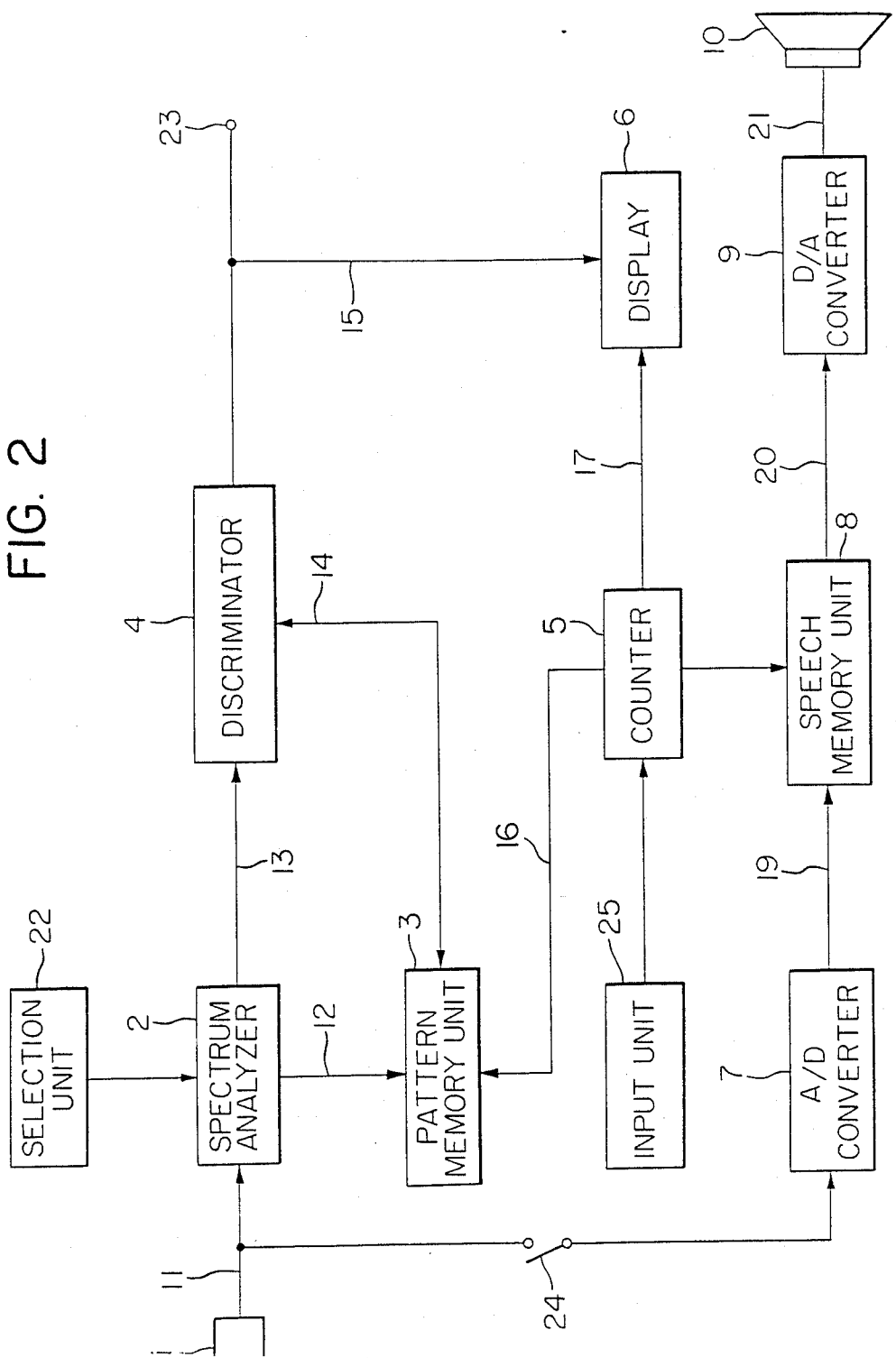

SYSTEM FOR REGISTERING SPEECH INFORMATION TO MAKE A VOICE DICTIONARY

This application is a continuation of application Ser. No. 804,236, filed 12/03/85, abandoned, which is a continuation of Ser. No. 606,157, filed 5/02/84, abandoned, which is a continuation of Ser. No. 318,262, filed 11/04/81, now U.S. Pat. No. 4,461,023, issued July 17, 1984.

BACKGROUND OF THE INVENTION

1. Field of the Invention

The present invention relates to a speech recognition system having an additional memory for storing speech or spoken words to be registered and a voice output means for reproducing the stored registered speech words when the speech words are re-registered.

2. Description of the Prior Art

In recent years, as the speech recognition rate in the speech recognition system was increased, a voice-input typewriter using the speed recognition system has been put into use. In this type of voice-input typewriter, a text to be typed is inputted by voice to a voice input device and the recognition result by the voice input device is printed by a printer. In the speech recognition system used in such a voice input device, speech words to be recognized are registered or entered in the system and a voice pattern of a word to be recognized is compared with voice patterns of the registered words to select a registered word having the closest voice pattern. In order to register the words in a conventional speech recognition system, a numeric display for displaying registered locations and a table of the numerals versus the registered words are provided and the words are registered repeatedly several times while watching the display and the table to generate well-averaged registered patterns. This method works satisfactorily when the number of words registered is small, but when the number of words registered is large a long time is required to prepare the table and register the words. In addition, in the second and subsequent runs of registration, the comparison operation is troublesome because the registrations must be made while watching the table, and it is difficult to input the voice by a microphone with a constant magnitude.

SUMMARY OF THE INVENTION

It is an object of the present invention to provide a voice dictionary having a registration mode for preparing a spoken word dictionary for use in speech recognition and a recognition mode for actually affecting speech recognition using registering speed information.

A system for registering speech information as a typical pattern for use in a word recognition system is disclosed which includes an input means for inputting spoken words, a mode change means for changing between a word registration mode and a word recognition mode, a memory means for storing, in the word registration mode, a spoken word pattern input by the input means for use in a word recognition mode, in the word registration mode the same spoken word is input as input data a plurality of times and stored in said memory means as a typical spoken word pattern for use in the recognition mode, an output means for reading, when the system is in the registration mode and a selected spoken word is input for the Nth time, the selected spoken word having been stored in the memory means prior to the Nth time, the output means also for outputting the selected spoken word as spoken information.

BRIEF DESCRIPTION OF THE DRAWINGS

FIG. 2 shows a block diagram of a speech recognition system in accordance with another embodiment.

DETAILED DESCRIPTION OF THE PREFERRED EMBODIMENTS

Figure 1:
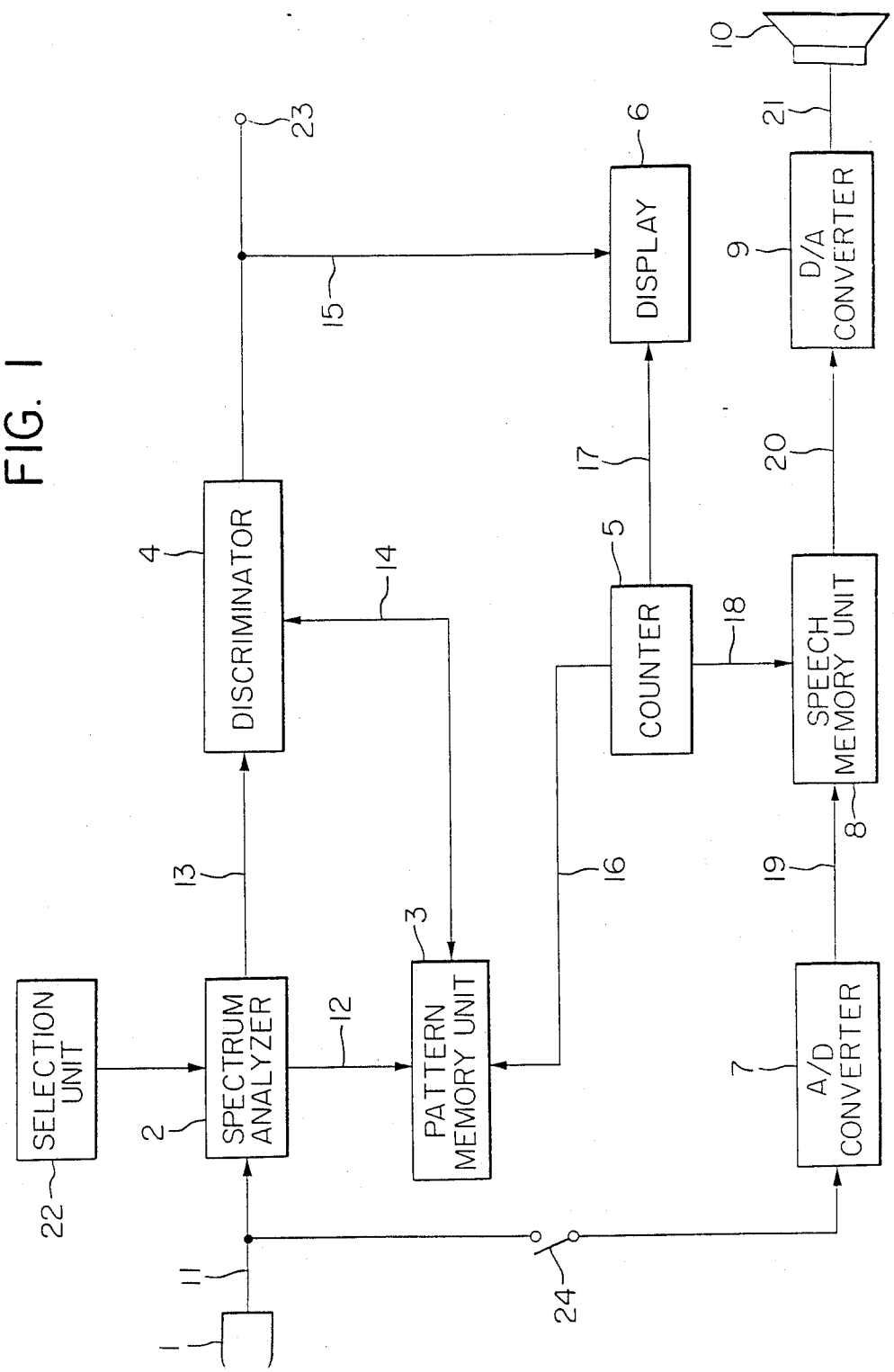
FIG. 1 shows a block diagram of a speech recognition system in accordance with one embodiment of the present invention.

One embodiment of the present invention is now explained with reference to a block diagram shown in FIG. 1.

In FIG. 1, numeral 1 denotes a microphone for inputting voice. Through the microphone 1, words to be registered and a word to be recognized are supplied to a spectrum analyzer 2 which analyzes and patterns the inputted voice to speech or spoken words. Only the words to be registered are supplied to an A/D converter 7 in a voice generator. The analyzed and patterned outputs from the spectrum analyzer 2 for the words to be registered are supplied to a pattern memory 3 while the output from the spectrum analyzer 2 for the word to be recognized is supplied to a discriminator 4. Connector terminal 23 connects the output from discriminator 4 to a printer such as a voice-input typewriter and the like. The pattern memory 3 stores the patterns of the words to be registered which have been decomposed to frequency components by the spectrum analyzer 2. The storage locations are specified by a counter 5. The discriminator 4 compares the pattern of the word to be recognized which has been analyzed by the spectrum analyzer 2 with the pattern of the registered words stored in the pattern memory 3 and selects the closest pattern and supplies it to a display 6. The address of the selected registered word pattern is also displayed on the display 6. On the other hand, the speech words to be registered which were inputted through the microphone 1 are supplied to the A/D converter 7 where they are digitized and the digital output signals are stored in a voice memory 8 at storage locations specified by the counter 5. When re-registered, the digital signals of the registered words are also addressed by the counter 5. The output of the voice memory 8 is supplied to a D/A converter 9 where it is converted to an analog signal, which is then supplied to a speaker 10 to reproduce the voice of the registered word. Numeral 22 denotes a selector having a registration key (not shown) and a recognition key (not shown). By depressing either the registration key or the recognition key, the spectrum analyzer 2 determines whether it is to supply the patterned speech word to the pattern memory 3 or to the discriminator 4. In other words, it determines whether the speech word inputted by the microphone 1 is word to be registered or the word to be recognized. Numeral 24 denotes a switch which is turned on when the registration key is depressed to input the speech word from the microphone 1 as a word to be registered. Numerals 11 to 21 denote signal lines for transmitting and receiving signals among the respective blocks.

The operation of the speech recognition system thus constructed is now explained. When the speech word is to be registered, the registration key of the select in unit 22 is first depressed and the word to be registered is inputted from the microphone 1. The word to be registered inputted from the microphone 1 is supplied to the spectrum analyzer 2 through the signal line 11 and analyzed and patterned thereby. The patterned word to be registered is supplied to the pattern memory 3 through the signal line 12 and stored therein at the address specified by the counter 5. On the other hand, the word to be registered inputted from the microphone 1 is also supplied to the A/D converter through the switch 24 which has been turned on in response to the depression of the registration key of the selector 22 and converted to a digital signal. The resulting digital signal is supplied to the voice memory 8 through the signal line 19 and stored therein at the address specified by the counter 5. The address signals supplied from the counter 5 to the pattern memory 3 and the voice memory 8 are identical. After the other words to be registered have been registered in a similar way, a second run of registration begins. In the prior art speech recognition system discussed on pages 1 and 2 of the present application, the second and subsequent runs of registration must be done by watching and comparing the table of the registered words and the display on which the current registered address is displayed. In the present speech recognition system, before the second run of registration begins, the digital signals of the registered words are read out of the voice memory 8 by the instruction from the counter 5 in the sequence of the addresses in the previous run. When the digital signal of the first registered word is first read out, the digital signal is converted to an analog signal by the D/A converter 9 and the analog signal is then converted to voice by the speaker 10. One who is to register his or her speech word again says the same registered word into the microphone 1 while listening to the voice reproduced by the speaker 10. After the first word has been re-registered, the next registered word stored in the voice memory 8 is specified by the counter 5 and it is supplied to the D/A converter 9 and the speaker 10 to reproduce the same voice as originally inputted for registration. In the present invention, in the second run of registration, i.e., after the first run of registration has been completed, usually only registered words having low recognition rates are re-registered selectively. The person, who is to register his or her speech word, again registers the speech word while listening to the reproduced voice. The above operation is repeated each time when the registered words registered in the previous run are sequentially reproduced by the speaker 10 until the second run of registration is completed. By repeating third, fourth or more runs in the same manner, well-averaged registered patterns can be produced.

FIG. 2 shows a block diagram of a speech recognition system in accordance with another embodiment of the present invention. In FIG. 2, like elements to those shown in FIG. 1 are designated by the like numerals. The present embodiment differs from the previous embodiment in that in the second run of registration after the first run of registration, only the registered words having low recognition rates are selectively re-registered. In the case, the counter 5 is set by an input unit 25 to specify the addresses of the pattern memory 3 and the voice memory 8. The registered word is read out of the voice memory 8 from the address specified by the counter 5 and supplied to the D/A converter 9 where it is converted to an analog signal which is reproduced as voice by the speaker 10. The person who is to register the speech word reinputs the speech word while listening to the voice from the speaker 10 and the word to be re-registered is analyzed and patterned by the spectrum analyzer 2 and the pattern of the word to be re-registered is stored in the pattern memory 3 at the address specified by the input unit 25. The input unit 25 comprises ten numeric keys and a clear key so that the counter 5 is set by depressing selected one or ones of ten numeric keys. When the next desired registered word is to be re-registered, the clear key of the input unit 25 is depressed to clear the content of the counter 5 and then the content of the counter 5 is updated by depressing desired one or ones of the ten numeric keys.

What I claim is:

1. A system for registering speech information as a typical pattern for use in a word recognition system comprising:
    input means for inputting spoken words;
    mode change means for changing between a word-registration mode and a word-recognition mode;
    memory means in said word-registration mode for storing a spoken word obtained on the basis of inputting the same spoken word a plurality of times for use in said word-recognition mode; and
    output means for reading, when said system is in the registration mode and selected spoken word is input for the Nth time, said selected spoken word stored in said memory means before the Nth time, and said output means for outputting said selected spoken word as spoken information.

2. The system for claim 1, wherein said memory means comprises a first memory means for storing averaged speech pattern information and a second memory means for storing the spoken information.

3. The system of claim 2, wherein the averaged speech pattern to be stored in the first memory means and an address specifying a storage location of spoken information to be stored in the second memory means in response to the averaged speech pattern are associated with each other.

4. The system of claim 1, wherein said input means effects the input of said selected spoken word for the Nth time after output of said selected spoken word from said output means.

5. A system for registering speech information as a typical pattern for use in a word recognition system comprising:
    input means for inputting a spoken word from an operator a plurality of times;
    mode change means for changing between a word-registration mode and a word-recognition mode;
    memory means for storing a spoken word pattern input by said input means for use in a word-recognition mode, said word-registration mode storing a typical spoken word pattern for recognition in said memory means on the basis of inputting said spoken word a plurality of times; and
    output means for reading said spoken word stored in said memory before the Nth time and for outputting said stored word as spoken information upon the input of said spoken word by said operator for the Nth time when said system is in the registration mode,
    wherein said system further comprises designation means for designating a word pattern registered in said memory means and said output means reads said spoken word in order to re-register the word pattern designated by said designation means.

6. The system of claim 5, wherein said mode change means terminates the registration mode when said operator repeats the input of said spoken word for the Nth time after listening to the spoken information output by said output means in response to the input of the spoken word for the (N−1)th time when said system is in the registration mode.

* * * * *

UNITED STATES PATENT AND TRADEMARK OFFICE
CERTIFICATE OF CORRECTION

PATENT NO. : 4,831,653

DATED : May 16, 1989

INVENTOR(S) : Hirohiko Katayama

It is certified that error appears in the above-identified patent and that said Letters Patent is hereby corrected as shown below:

On the title page:

Between [22] and [30]
    Insert --[63] Related U.S. Application Data:
    Continuation of Ser. No. 804,236, 12/03/85 abandoned, which is a continuation of Ser. No. 606,157, 5/02/84, abandoned, which is a continuation of Ser. No. 318,262, 11/04/81, now U.S. Pat. No. 4,461,023, issued 7/17/84.

[56] References Cited
    Change "3,770,892 11/1983 Clapper" to --3,770,892 11/1973 Clapper--.

[57] Abstract
    Change "storing" to --(storing)--.

UNITED STATES PATENT AND TRADEMARK OFFICE
CERTIFICATE OF CORRECTION

PATENT NO. : 4,831,653

DATED : May 16, 1989

INVENTOR(S) : Hirohiko Katayama

It is certified that error appears in the above-identified patent and that said Letters Patent is hereby corrected as shown below:

COLUMN 1
    Line 23, change "speed" to --speech--.
    Line 53, change "affecting" to --effecting--.
    Line 54, change "speed" to --speech--.

COLUMN 2
    Line 58, change "is word" to --is a word--; and change "the word" to --a word--.
    Line 67, change "select in unit" to --selection unit--.

COLUMN 3
    Line 11, change "selector 22" to --selection unit 22--.
    Line 20, change "on pages 1 and 2 of the present application" to --in column 1 of the present patent--.
    Line 57, change "the case," to --this case,--.

COLUMN 4
    Line 3, change "of ten" to --of the ten--.
    Line 20, change "selected" to --a selected--.
    Line 25, change "for" to --of--.

UNITED STATES PATENT AND TRADEMARK OFFICE
CERTIFICATE OF CORRECTION

PATENT NO. : 4,831,653

DATED : May 16, 1989

INVENTOR(S) : Hirohiko Katayama

It is certified that error appears in the above-identified patent and that said Letters Patent is hereby corrected as shown below:

COLUMN 4 (Continued)
    Line 51, change "memory" to --memory means--.
    Line 54, change "registration" to --word-registration--.
    Line 67, change "registration" to --word-registration--.

Signed and Sealed this

Eighth Day of June, 1993

Attest:

MICHAEL K. KIRK

Attesting Officer     Acting Commissioner of Patents and Trademarks